A. W. KOAGE.
CORN PLANTER AND MARKER.
APPLICATION FILED MAR. 8, 1909.
942,394.
Patented Dec. 7, 1909.
4 SHEETS—SHEET 3.
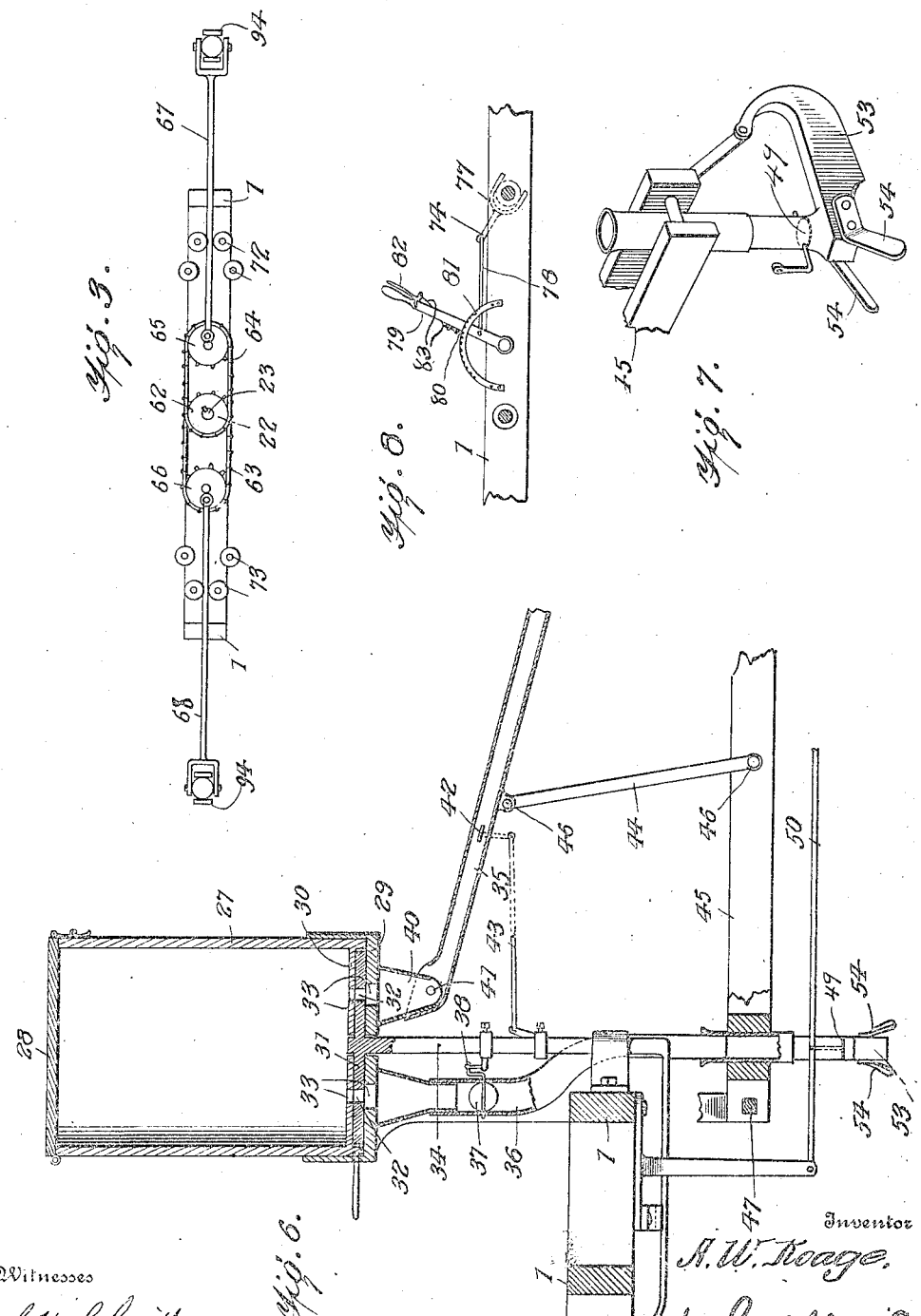

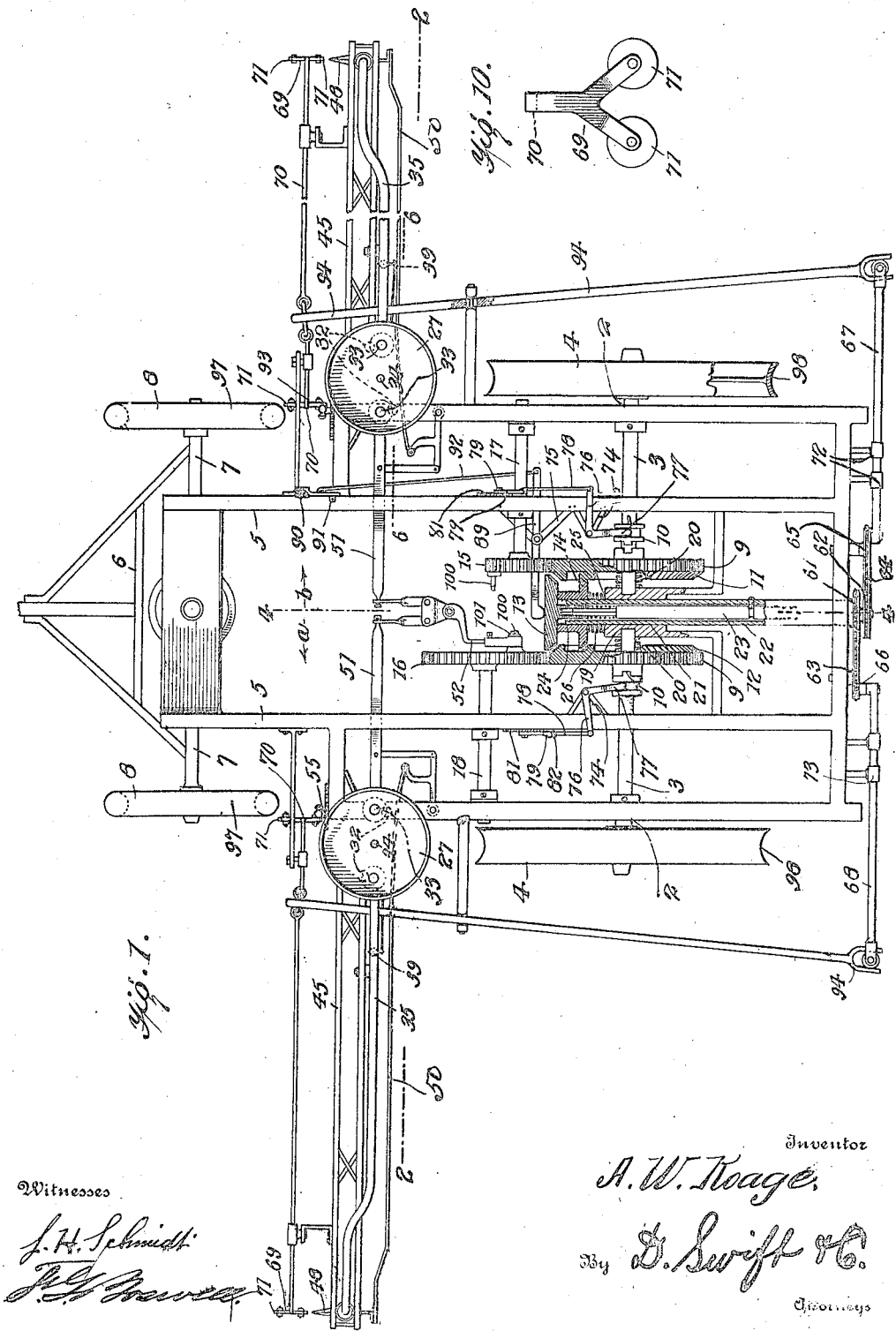

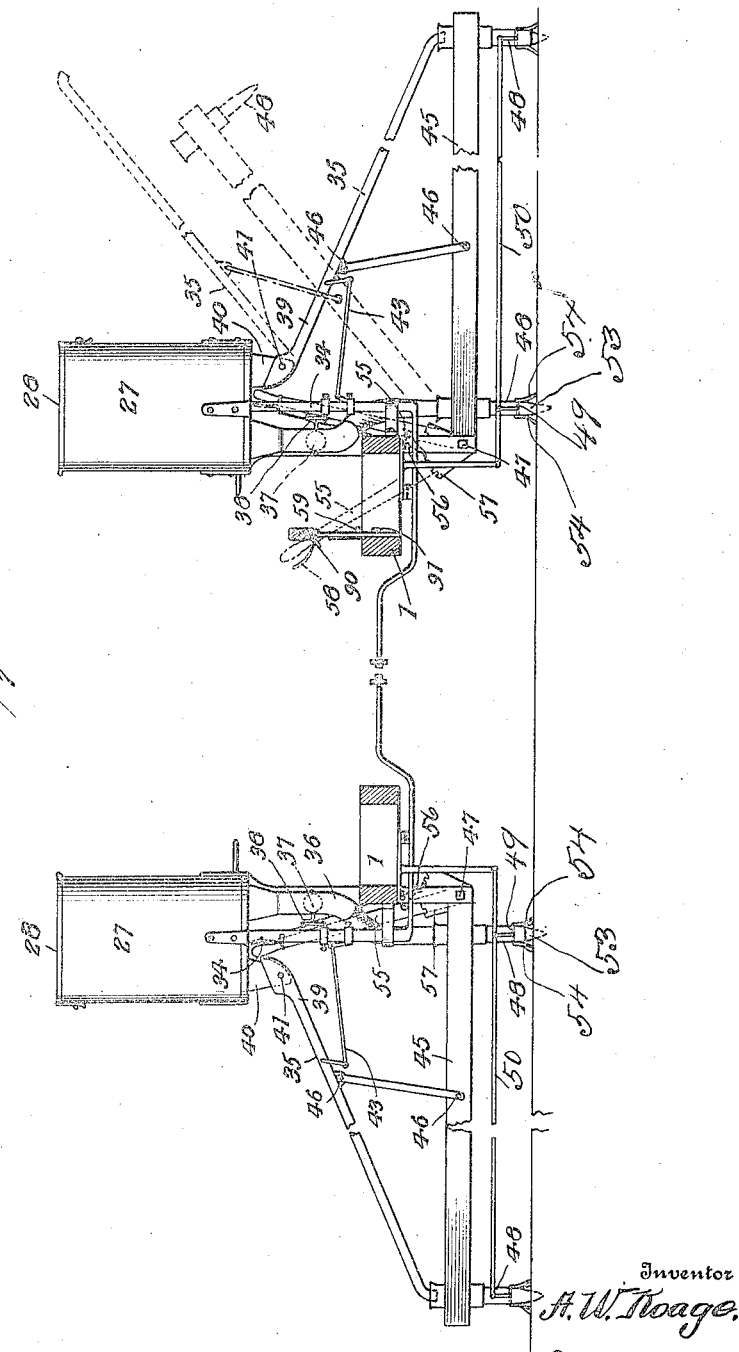

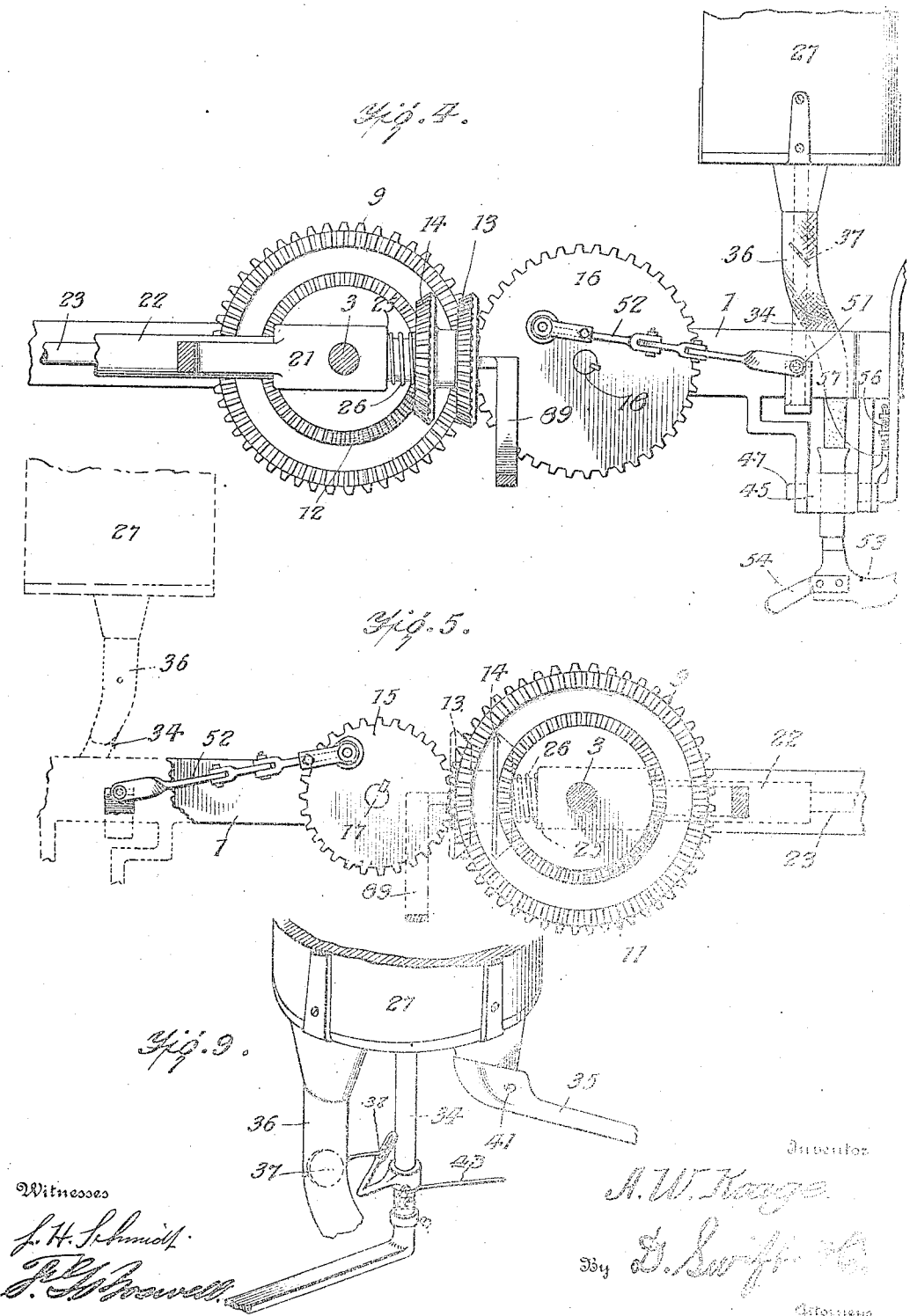

UNITED STATES PATENT OFFICE.

AUGUSTUS W. KOAGE, OF PINE RIVER, WISCONSIN.

CORN-PLANTER AND MARKER.

942,394.

Specification of Letters Patent.

Patented Dec. 7, 1909.

Application filed March 8, 1909. Serial No. 482,122.

*To all whom it may concern:*

Be it known that I, AUGUSTUS W. KOAGE, a citizen of the United States, residing at Pine River, in the county of Waushara and State of Wisconsin, have invented a new and useful Corn-Planter and Marker; and I do hereby declare the following to be a full, clear, and exact description of the invention, such as will enable others skilled in the art to which it appertains to make and use the same.

This invention pertains to a new and useful corn planter, and the invention in its broadest principles aims as its main object to provide a practical device of this design, embodying new and novel means by which corn may be planted in furrows simultaneously, as will be hereinafter clearly specified.

The invention has for a further object to provide means, by which the location of each hill of corn may be indicated in the four rows at the same time. The marking or the indicating of the locations at which the corn is to be planted alternates with the dropping of the corn at these locations.

A further object is to provide means whereby a quick consecutive dropping of the corn is accomplished, in which case the marking mechanism is not operated.

A further object of the invention is to provide new and novel means for raising and lowering the lateral extending grain chute, through which the grain travels, so as to reach the conducting tubes or chutes and furrow openers, in which the traps or cutoffs are located. These traps or cutoffs are automatically operated, as the machine is drawn through the field.

This invention comprises further objects and combinations of elements, which will be hereinafter more fully described, shown in the accompanying drawings, and the novel features thereof will be pointed out by the appended claims.

The features, elements and the arrangement thereof, which constitute the above entitled invention, may be changed and varied, that is to say, in an actual reduction to practice with the understanding that the changes and variations accruing from said reduction to practice are limited to the scope of the appended claims.

To obtain a full and correct understanding of the details of construction, combinations of features, elements and advantages, reference is to be had to the hereinafter set forth description and the accompanying drawings in connection therewith, wherein—

Figure 1 is a top plane view of the corn planter and marker, clearly disclosing the novel features of the invention, a portion of the apparatus being shown in section. Fig. 2 is a cross sectional view on line 2—2 of Fig. 1, clearly disclosing in side elevation the lateral chutes which extend from either side of the frame of the apparatus, and also disclosing the means for raising and lowering the same. Fig. 3 is a rear view or elevation of just a portion of the apparatus, only disclosing a portion of the operating parts of the markers 69. Fig. 4 is a sectional view on line 4—4 of Fig. 1 looking in the direction of the arrow $a$. Fig. 5 is a sectional view on the same line that Fig. 4 is taken looking in the direction of the arrow $b$. Fig. 6 is a sectional view on line 6—6 of Fig. 1 clearly disclosing the seed boxes, the grain chutes, and their furrow openers. Fig. 7 is a perspective view of one of the outer furrow openers, the grain chutes, and the plates or scrapers for covering the seed or corn after having been dropped. Fig. 8 is an elevation of one of the levers 79 and its operating parts, showing the manner in which the clutch mechanism is operated. Fig. 9 is a perspective view of a portion of one of the seed boxes or receptacles, showing the manner in which the cut-offs 37 are operated by the shafts 34. Fig. 10 is an elevation of one of the markers 69.

In regard to the drawings, wherein similar reference characters indicate corresponding parts in the several illustrations, 1 designates the rectangular framework of the machine. Mounted in suitable bearings 2 of the frame is the power shaft or axle 3, upon either end thereof is journaled the driving wheels 4. These driving wheels 4 are designed to transmit motion to the said shaft. Fixed to the frame 1 is a forward extension frame 5, to which is pivoted the oscillating truck or frame 6. This oscillating truck or frame 6 is provided with the lateral axle or shaft 7 of the apparatus, to either end of which the forward wheels 8 are journaled, as shown clearly in Fig. 1.

The shaft 3 has journaled thereon a pair of gear wheels 9, which are loosely mounted. These gear wheels 9 are thrown in and out of gear with the said shaft by the suitable clutch mechanisms 10, as shown clearly in Fig. 1. The adjacent faces of the gear wheels 9 are provided with beveled gear teeth 11 and 12, which are designed to mesh with the beveled gears 13 and 14, at certain times, which will be hereinafter clearly specified. The gear teeth of the wheels 9, that is, the teeth upon the peripheries thereof, mesh with the gear wheels 15 and 16, which are mounted upon stub axles or shafts 17 and 18 of the apparatus, as shown clearly in Fig. 1 of the drawings.

Interposed between a shoulder 19 of the shaft 3 and one of the gear wheels 9 is a spring 20, the purpose of which is to hold the said gear wheel from engagement with the gears 13 and 14. Mounted in suitable bearings 21 of the frame is a hollow shaft 22, through the bore of which a shaft 23 extends; upon the shaft 23 the gear wheel 13 is mounted, while upon the hollow shaft 22 the gear wheel 14 is journaled, as shown clearly in Fig. 1 of the drawings. The gear wheel 13 is sleeved within the shaft 22 and about the shaft 23, as shown at 24, and interposed between a collar 25 upon the shaft 23 and the said sleeve is a spring 26, as shown clearly in Fig. 1. The purpose of this spring is to hold the gear wheel 13 from engagement with one set of gear teeth 11 and 12 of the gears 9, as disclosed by Figs. 1, 4 and 5.

Upon the forward portion of the frame 1, upon either side thereof, is located the grain boxes 27, which are cylindrical as shown, and provided with covers or closures 28. Fixed within and to both the grain boxes, adjacent to their lower portions, are two plates 29 and 30, between which the oscillating disks or members 31 are disposed, as shown clearly in Fig. 6 of the drawings. The plates 29 and 30 are perforated, as shown, while the disks or members 31 are provided with specified number of openings, in this instance, four openings 32 are provided, which are designed to register with the openings or perforations 33 of the plates 29 and 30, so as to allow the grain to fall into their respective chutes or tubes. These disks or members 31 are operated by the shafts 34, the oscillation of which will be hereinafter set forth.

The tubes or chutes for the grain are indicated by the numerals 35 and 36. The chutes 36 depend directly below the grain boxes, and located in their hollow portions are traps or cutoffs 37, which are oscillated through the medium of a connection 38 with the said shafts 34, as shown clearly in Figs. 2 and 6.

The chutes 35 are provided with a pivotal connection with the grain outlets 40 of the grain boxes, as shown at 41, and in the chutes 35 are located traps or cutoffs 42, which are similar to those of the chutes 36, and are operated by the connections 43 with the said shafts 34, as clearly disclosed in Figs. 2 and 6. The chutes 35 are supported by the links 44, which are pivotally connected thereto and to the lateral extending bars or beams 45, as shown clearly at 46, reference being had to Figs. 2 and 6. These bars or beams 45 are pivoted to the frame of the apparatus, as shown at 47; and to either end of the said bars the conducting tubes or chutes 48 and furrow openers are connected, as shown clearly in the drawings. Located within the tubes are cutoffs or traps 49, which are operated by the pitman rods 50, which have pivotal connections with the oscillating members or beams 51. These members or beams 51 are operated by means of the gears 15 and 16, through the medium of the adjustable pivotal connections or pitman members 52, as shown in Fig. 1. The oscillation of the members or beams 51 also operates the shafts 34 by which the falling of the grain from the grain boxes is regulated and also by which the plurality of traps or cutoffs, as above specified, are operated.

The conducting tubes or chutes and furrow openers 48 are provided with suitable runners or furrow openers 53 which open the soil to admit of the seed or grain. In the rear of the runners or furrow openers the said tubes are provided with, shields, plates or scrapers 54, which are for the purpose of covering the grain or seed after having been admitted in the openings of the soil. The beams or bars 45 are raised or lowered upon their pivots, by means of the levers 55, which are provided with suitable pawls 56, to engage the teeth of the quadrants 57. These pawls 56 are operated by the hand grips 58, which are connected to the pawls by means of the rods 59. In this manner, the bars or beams 45 may be held in adjusted positions.

Journaled to the ends of the shafts 23 and 22 are sprocket wheels 61 and 62, about which the chains 63 and 64 travel. These chains 63 and 64 travel about the sprockets 65 and 66, to which are eccentrically connected the bars 67 and 68, which are designed, as shown, to have an oscillating motion as well as a reciprocating motion, through the medium of which the markers 69 are operated as shown in Fig. 10. These markers 69 consist of forked frames 70, in the arms of which the wheels 71 are journaled. The bars 67 and 68 are disposed between a plurality of rollers or friction members 72 and 73, and by the disposition of these rollers or friction member the said bars or members 67 and 68 are oscillated; in other words, the bars or members 67 and 68 have a pivotal action between two of the rollers or friction members 72 and 73, at the same time they are being reciprocated.

Fixed to the frame 1 of the apparatus are bracket members 74, to which are pivoted the bell crank levers 76, which are forked at one end, as at 77, so as to encircle the clutch members, as clearly shown. Connected to the other ends of the bell crank levers are the rods 78, which are attached to and manipulated by the levers 79, as will be clearly seen in Figs. 1 and 8. The levers 79 are provided with pawls 80, which engage the teeth of the quadrants 81, for holding the levers in adjusted positions. The pawls are operated by means of the hand grips 82 and the connections 83, as will be clearly understood when examining Figs. 1 and 8.

Pivoted to each bracket 75 is a lever 89, one end of which is designed to engage the face of the gear 13, so as to force the same backward against the tension of the spring 26, so as to hold the said gear wheel in engagement with the teeth 11 and 12 of the gears 9, and, when so operated, the marking mechanism is manipulated so as to indicate the locations at which the corn or grain is to be planted. The lever 89 is oscillated through the medium of the foot lever 90, which is pivotally mounted, as at 91, to the frame 5 of the apparatus. The foot lever 90 is connected to the lever 89 by means of the pitman rod 92, as shown clearly in Fig. 1. By the manipulation of the foot lever 90 the markers 93 and 69 are operated, which markers precede the furrow openers, as the apparatus is drawn through the field. The members 94 are operated by the members 67 and 68, and by the operation of said members 94, the forked members 70 are oscillated, thereby causing the wheels 71 to come in contact with the earth, in order to indicate the location, at which the grain should be planted.

The markers 93 indicate the locations at which grain or seed is planted, that is, the locations directly beneath the seed or grain boxes, while the markers operated by the bars or members 67 and 68 indicate the locations where grain or seed is planted to either side of the apparatus, as will be clearly manifest.

The forward wheels 8 are provided with rims and tires which in cross section are of a circular contour, as shown at 97, while the rear wheels of the apparatus have their annular peripheries concave, as shown at 98, thus providing sharp edges upon either side of the said concave portion, for the purpose of preventing the apparatus from slipping and to act as coverers. At the end of each row of corn which is planted, the bars 45 and the chutes 35 are raised, so as to allow the apparatus to be turned so as to start the planting of another row of corn; after the apparatus is turned and ready to plant the next row of corn, the said bars 45, and their chutes 35, are lowered, as will be clearly understood.

It is apparent that by changing the connection 52, so that the end thereof will be pivotally connected to the gear 15, quick and consecutive dropping of the grain is accomplished. The quick and consecutive dropping of the grain is caused by the gear 15, the diameter of which is much smaller than that of the gear 16, thereby allowing a much shorter and quicker stroke to the said members or beams 51; in changing the pivotal connection of the connection 52, the fulcrums of the bars or members 51 are changed, by moving the same to one side or the other, by loosening the nuts upon said fulcrums, which fulcrums comprise bolts 100 and the nuts which engage the threaded ends of said bolts are designated by the numerals 101. By this construction quick and consecutive dropping of the grain is accomplished.

In driving the machine or apparatus through a field, the shaft 3 is operated, transmitting motion to the gears 9 and thence to the gears 15 and 16, either one or the other being idly rotated, that is to say, if the connection 52 is connected to the gear 16, the gear 15 rotates idly, and vice versa. If the motion is transmitted to the gear 16, the members or bars 51 are oscillated, thus operating the disks or members 31 of the seed boxes, allowing the seed therein to fall through the respective chutes, namely 35 and 36. By the oscillation of the members or bars 51, the shafts 34 which operate the said disks or members 31, also operate the trap or cutoffs 49, 42, and 37, as will be clearly understood, and when the said traps or cutoffs are operated, the grain or seed is dropped through the conducting tubes. But prior to this operation, the markers are operated by the operator of the apparatus, who presses the foot levers 90, so as to cause the lever 89 to force the gear 13 rearward, which will cause the bars or members 67 and 68 to be reciprocated as well as oscillated, which will operate the markers which precede the tubes at the ends of the chutes 35. In applying pressure to the foot lever 90 now and then, or between the dropping of grain, all the markers are operated including the markers in front of the conducting tubes 48, as will be clearly understood.

From the foregoing, the essential features, elements and the operation of the device, together with the simplicity thereof, will be clearly apparent.

Having thus fully described the invention, what is claimed as new and useful, is:—

1. In a corn planter, a frame having traction wheels, a manually controlled gear mechanism operated by said wheels, seed receptacles having oscillating disks operated by said mechanism, chutes communicating with said receptacles and provided with furrow openers, markers arranged forward of the openers, and a lever mechanism operated by said gear mechanism for continuously and intermittently operating two of said markers, while the others are operated manually at times.

2. In a corn planter, a frame having traction wheels, a manually controlled gear mechanism operated by said wheels, seed receptacles having oscillating disks operated by said mechanism, chutes communicating with said receptacles and provided with furrow openers, markers arranged forward of the openers, a lever mechanism operated by said gear mechanism for continuously and intermittently operating two of said markers, while the others are operated manually at times, and interchangeable means coöperative with the gear mechanism whereby quick and consecutive operation of said disks may be obtained.

3. In a corn planter, a frame having traction wheels, a manually controlled gear mechanism operated by said wheels, seed receptacles having oscillating disks operated by said mechanism, chutes communicating with said receptacles and provided with furrow openers, markers arranged forward of the openers, a lever mechanism operated by said gear mechanism for continuously and intermittently operating two of said markers, while the others are operated manually at times, interchangeable means coöperative with the gear mechanism whereby quick and consecutive operation of said disks may be obtained, and means manually manipulated whereby the gear mechanism may be thrown into and out of gear with the traction wheels.

4. In a corn planter, a frame, seed receptacles having oscillating disks, chutes communicating with said receptacles and provided with furrow openers, said openers, and chutes having cutoffs, means for operating the cutoffs and the disks, markers arranged forward of the openers and two of them operated continuously by said means while the others are operated at times manually.

5. In a corn planter, a frame, seed receptacles having oscillating disks, chutes communicating with the receptacles and provided with furrow openers, said openers and chutes having cutoffs, means for operating the disks and cutoffs simultaneously, markers arranged forward of the openers and two of them operated continuously by said means, and means operated manually for operating the other markers, and spring actuated means for restoring the manually operated markers to their normal position.

6. In a corn planter, a frame, seed receptacles having oscillating disks, said receptacles having directly downwardly depending chutes and provided with chutes extending laterally therefrom upon either side of the frame, said chutes having furrow openers, said openers and chutes having cutoffs, means for operating the cutoffs, markers arranged forward of the openers, a lever mechanism arranged between said markers and said means, so as to continuously and intermittently operate two of the markers, and means for manually operating the other markers.

7. In a corn planter, a frame, seed receptacles having oscillating disks, said receptacles having directly downwardly depending chutes and provided with chutes extending laterally therefrom upon either side of the frame, said chutes having furrow openers, said openers and chutes having cutoffs, means for operating the cutoffs, and markers arranged forward of the openers and two of them operated continuously by said means, while the others are intermittently and manually operated for indicating the locations where the seed is to be planted.

8. In a corn planter, a frame, seed receptacles having oscillating disks, said receptacles having directly downwardly depending chutes and provided with chutes extending laterally therefrom upon either side of the frame, said chutes having furrow openers, said openers and chutes having cutoffs, means for operating the cutoffs and the disks, markers arranged forward of the openers, a lever mechanism arranged between said markers and said means, so as to continuously and intermittently operate two of the markers, means for manually operating the other markers, said openers having runners and provided with shields, and scrapers.

9. In a corn planter, a frame, seed receptacles having oscillating disks, chutes communicating with the receptacles and provided with furrow openers, said openers and chutes having cutoffs, means for operating the disks and cutoffs, said means having interchangeable means whereby quick and consecutive operation of the said disks and cutoffs may be obtained.

10. In a corn planter, a frame, seed receptacles having oscillating disks, chutes communicating with the receptacles and provided with furrow openers, said openers and chutes having cutoffs, means for operating the disks and cutoffs, said means having interchangeable means whereby quick and consecutive operation of the said disks and cutoffs may be obtained, and markers operated by said means for indicating the locations where the seed is to be planted.

11. In a corn planter, a frame, seed receptacles having oscillating disks, chutes communicating with receptacles and provided with furrow openers, said openers having cutoffs, means for operating the disks and cutoffs, said means having interchangeable means whereby quick and consecutive operation of the said disks and cutoffs may be obtained, markers for indicating the locations where seed is to be planted, said means having mechanism manually controlled for operating the markers, said markers alternate in their operations with the dropping of the seed.

12. In a corn planter, a frame, seed receptacles having oscillating disks, chutes communicating with the receptacles and provided with furrow openers, said openers having cutoffs, means for operating the disks and cutoffs, said means having interchangeable means whereby quick and consecutive operation of the said disks and cutoffs may be obtained, markers for indicating the locations where seed is to be planted, said means having mechanisms manually controlled for operating the markers, said markers alternate in their operations with the dropping of the seed, said mechanisms having means for returning the markers to their normal positions.

In testimony whereof I have signed my name to this specification in the presence of two subscribing witnesses.

AUGUSTUS W. KOAGE.

Witnesses:
ROBERT L. WILLIAMS,
GEO. E. PICKETT.